United States Patent [19]
Matsushita et al.

[11] Patent Number: 5,245,383
[45] Date of Patent: Sep. 14, 1993

[54] COLOR BALANCE MEASURING DEVICE

[75] Inventors: Terumi Matsushita; Yoshio Ozawa, both of Kanagawa, Japan

[73] Assignee: Fuji Photo Film Co., Ltd., Kanagawa, Japan

[21] Appl. No.: 872,503

[22] Filed: Apr. 23, 1992

[30] Foreign Application Priority Data

Apr. 26, 1991 [JP] Japan .................................. 3-096860
Apr. 26, 1991 [JP] Japan .................................. 3-096861

[51] Int. Cl.$^5$ ............................................ G03B 27/80
[52] U.S. Cl. ............................................ 355/38
[58] Field of Search ............................ 355/38, 77, 68

[56] References Cited

U.S. PATENT DOCUMENTS

| | | | |
|---|---|---|---|
| 3,462,221 | 8/1969 | Tajima et al. | 355/77 |
| 4,526,462 | 7/1985 | Hope et al. | 355/38 |
| 4,774,548 | 9/1988 | Beaulieu et al. | 355/38 |
| 4,809,198 | 2/1989 | Terashita | 355/38 X |
| 5,083,152 | 1/1992 | Tokuda | 355/38 X |
| 5,083,154 | 1/1992 | Terashita | 355/68 |

*Primary Examiner*—Richard A. Wintercorn
*Attorney, Agent, or Firm*—Sughrue, Mion, Zinn, Macpeak & Seas

[57] ABSTRACT

A color balance measuring device for regulating color balance in a photographic printer in which color images recorded on a film are printed onto photographic paper to obtain photographic prints. In the color balance measuring device, a density measuring portion and a pusher member, which is movable in a direction of the density measuring portion, are provided opposing each other with a transport path of the photographic prints interposed therebetween. The density measuring portion and the pusher member are disposed at predetermined distances with respect to surfaces of the photographic prints. A white reference plate is provided at a density measuring portion side of the pusher member. The density measuring portion is pushed via the white reference plate by movement of the pusher member. Because the density measuring portion and the pusher member are provided so as to be separated from the transport path, the density measuring portion and the pusher member do not contact the photographic prints which are being transported, and do not damage the surfaces of the photographic prints.

18 Claims, 8 Drawing Sheets

COLOR BALANCE MEASURING DEVICE

BACKGROUND OF THE INVENTION

1. Field of the Invention

The present invention relates to a color balance measuring device for regulating color balance of a photographic printer in which images are exposed onto a photosensitive material.

2. Background of the Invention

When color images, which are recorded on negative film, are printed onto photographic paper by a photographic printer, it is necessary to precisely control the amount of exposure and color balance to produce high-quality photographic prints. As a result, various photographic printers have been designed to obtain optimal prints by operating the amount of exposure and the color balance to effect color correction.

Adjustment of color balance in a photographic printer is effected in the following way. A standard print (referred to hereinafter as a "bull's eye print") is formed by a standard negative film (hereinafter, "bull's eye negative"), in which a round image of a predetermined color is recorded on a central portion thereof, being printed onto photographic paper. The image which is recorded on the bull's eye negative is printed in advance at the appropriate conditions onto a photographic print (hereinafter, "reference print"). For both the bull's eye print and the reference print, the amount of blue, green and red light, which is irradiated from a light source and reflected, are measured by light-intercepting particles provided in a density measuring portion. By comparing the results of the measurement of the reference print and the bull's eye print, exposure conditions (amount of exposure, exposure time for each color) in the photographic printer can be set.

Further, in the density measuring portion, it is necessary to adjust the measuring error of the light-intercepting elements (this adjustment is referred to hereinafter as "calibration"). Calibration is effected by the density measuring portion which measure for each color the quantity of light reflected on a while reference plate.

In a photographic printer, the color balance measuring device may be disposed at the operating panel. Color correction is effected by inserting the white reference plate, the bull's eye print, and the reference print into the color balance measuring device, and measuring the color balances thereof.

In a regular photographic printer, it is necessary to effect this color balance adjustment before beginning daily operation. Color balance adjustment is also effected after parts are changed, photographic paper is changed, developing processing liquids are replaced, and the like occurs at the exposure portion of the photographic printer.

However, in effecting calibration and color balance measurement, the white reference plate, the reference print and the bull's eye print must be tightly fit at the density measuring portion. Operation thereby becomes complex and troublesome. Moreover, in order to facilitate this operation, the density measuring portion is disposed in the transport path of the photographic prints. Therefore, the density measuring portion may contact the surfaces of the photographic prints. The surfaces of the photographic prints may be damaged, which lowers the quality of the final prints.

SUMMARY OF THE INVENTION

With the aforementioned in view, it is an object of the present invention to provide a color balance measuring device in which a density measuring portion is disposed along a transport path of photographic prints and which does not damage surfaces of the photographic prints.

The color balance measuring device, in which a white reference plate is disposed at a predetermined position with respect to the density measuring portion, is used in order to simplify the color balance measuring operation in a photographic printer.

However, in order to accurately measure the color balance by the density measuring portion, the white reference plate must be the appropriate white color. Namely, if the white reference plate is dirty, precise calibration of the density measuring portion cannot be effected. Further, in order to measure color balance precisely, the white reference plate or the like must be tightly fit against the density measuring portion. Namely, if the white reference plate or the like abuts on the density measuring portion while the white reference plate is tilted, gaps form in some areas between the white reference plate and the density measuring portion. Outside light may enter these gaps. It is therefore necessary to tightly fit the white reference plate to the density measuring portion.

With the aforementioned in view, an object of the present invention is to provide a color balance measuring device in which precise measurement of color balance can be effected simply.

The color balance measuring device of the present invention regulates color balance in a photographic printer in which color images recorded on a film are printed onto photographic paper to obtain photographic prints. The color balance measuring device includes a density measuring portion which is disposed at a predetermined distance with respect to surfaces of the photographic prints which are transported along a transport path, irradiates light from a light source towards the transport path, and measures per color the amount of reflected light; a pusher member which is provided opposing the density measuring portion such that the transport path is located between the pusher member and the density measuring portion, the pusher member being movable in directions of approaching and moving away from the density measuring portion; a white reference plate provided on a transport path side of the pusher member; and a moving device for moving at least one of the pusher member and the density measuring portion in directions in which the pusher member and the density measuring portion approach and move away from each other, and for pushing one of the pusher member and the density measuring portion toward the other via the white reference plate.

In the color balance measuring device of the present invention which is structured as described above, the density measuring portion and the pusher member are provided such that the transport path of the photographic prints is sandwiched therebetween. The white reference plate is disposed at the pusher member. Both the density measuring portion and the pusher member are disposed along the transport path and are disposed away from the transport path, such that neither the density measuring portion nor the pusher member contact the photographic prints which are being transported.

Accordingly, the pusher member and the density measuring portion do not contact the photographic prints. The surfaces of the photographic prints are not damaged, and the resulting prints are good quality. The pusher member and the density measuring portion are fit tightly together by the moving device. Calibration is thereby made possible by the white reference plate provided at the pusher member.

The bull's eye print, which is printed onto photographic paper by the bull's eye negative, is transported to the density measuring portion and stopped thereat. Thereafter, the bull's eye print is fit tightly to the density measuring portion by the pusher member and the density measuring portion, and density measurement is possible.

A device which moves the pusher member toward the density measuring portion can be used as the moving device. An urging member may be used to move the pusher member away from the density measuring portion.

The pusher member is formed of an elastic member. Accordingly, when the white reference plate contacts the density measuring portion, even if gaps form between the density measuring portion and the white reference plate, the pusher member elastically deforms. The white reference plate and the density measuring portion can thereby be tightly fit together.

The bull's eye print and the reference print are disposed between the pusher member and the density measuring portion. The pusher member can also deform elastically when these prints are fit to the density measuring portion. Therefore, the bull's eye print and the reference print can be tightly fit.

In this way, precise color balance measurement can be effected without light from the outside entering into the density measuring portion.

The pusher member and the white reference plate are integral, but can be separated from each other.

Even if the white reference plate is provided at the color balance measuring device, changing of the white reference plate is easy. Precise calibration of the color balance measuring device is possible as the white reference plate can always provide the appropriate white color.

As described above, the density measuring portion and the pusher member are provided so as to sandwich the transport path of the photographic prints therebetween. The density measuring portion and the pusher member are both provided along the transport path yet withdrawn therefrom so the density measuring portion and the pusher member do not contact the photographic prints which are being conveyed.

The photographic prints, which are conveyed in a vicinity of the density measuring portion, are transported with both end portions thereof in the transverse direction inserted into guide members. Further, an opening portion is provided adjacent to the density measuring portion.

At the color balance measuring device, when the color balance of the photographic prints, which have been printed and conveyed, is measured, the photographic print, with both end portions thereof inserted into the guide members, is fit to the density measuring portion by the pusher member. Density measurement is then effected.

An opening portion, which is adjacent to the density measuring portion and which communicates with the transport path opposed to the density measuring portion, is formed at one side end in the transverse direction of the transport path.

When a photographic print is inserted from the outside and color balance thereof is measured, by inserting the photographic print in the opening portion, the photographic print can be disposed on the transport path opposing the density measuring portion. Further, the photographic print inserted from the outside can be easily positioned at the measuring position with respect to the density measuring portion by one end of the photographic print being inserted into a guide member.

The density measuring portion is axially supported so as to rotate about a supporting axis in directions of approaching and moving away from the transport path of the photographic prints. The density measuring portion is urged by an urging member in a direction of moving away from the transport path.

In this way, in the color balance measuring device, the density measuring portion is rotated in a direction of moving away from the transport path of the photographic prints. The transport path in the vicinity of the density measuring portion can thereby be opened by the density measuring portion. With the pusher member as a reference, the photographic print inserted from outside can be positioned at the measuring position with respect to the density measuring portion. The supporting axis can be set at an arbitrary position separated from the density measuring position.

Moreover, when density is measured, it suffices to set the density measuring portion close to the transport path and to maintain the density measuring portion at this position near the transport path by a maintaining member.

In the color balance measuring device of the present invention structured as described above, the density measuring portion and the pusher member are provided separately from the transport path of the photographic prints. Accordingly, a remarkable effect can be achieved in that the density measuring portion and the pusher member do not contact the photographic prints, which are being transported, and do not damage the surfaces of the photographic prints.

In addition, color balance measurement at a photographic printer is facilitated by use of the color balance measuring device.

The pusher member, which is formed of an elastic body, elastically deforms and fits the white reference plate tightly to the density measuring portion. Therefore, precise density measurement can be effected without light from the outside entering the density measuring portion.

The pusher member and the white reference plate are integral but can be separated from each other. In this way, the white reference plate can be easily changed, and maintenance of the color balance measuring device improved.

With the above-described present invention, a color balance measuring device, which can measure color balance precisely, can be obtained.

The photographic print can be easily positioned at the measuring position at the density measuring portion since the photographic print can be inserted from the outside through the opening portion and guide members are disposed along the transport path.

The transport path in the vicinity of the density measuring portion can be opened by rotating the density measuring portion. Accordingly, the photographic print to undergo density measurement at the color balance measuring device can be easily inserted from the outside. At the color balance measuring device, by having the pusher member as a reference, the photographic print, which is inserted from the outside, can be easily positioned at the measuring position with respect to the density measuring portion.

In this way, in the color balance measuring device of the present invention, superior effects can be obtained in that a photographic print can be easily inserted from the outside, and color balance measurement can be effected easily.

DESCRIPTION OF THE PREFERRED EMBODIMENTS

Figure 1:
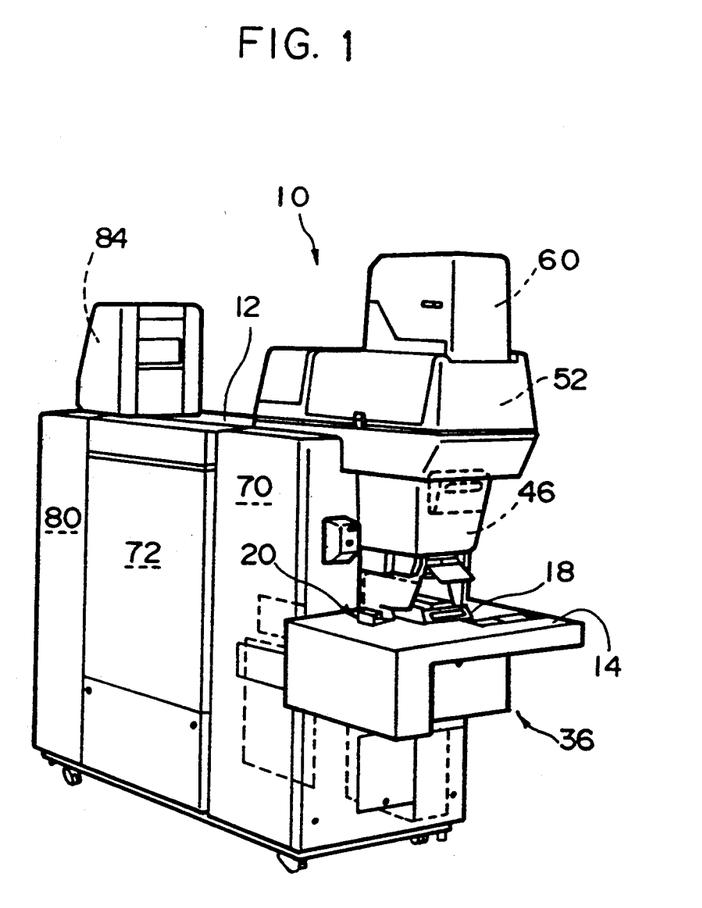
FIG. 1 is a perspective view of a printer processor of the present embodiment.
Figure 2:
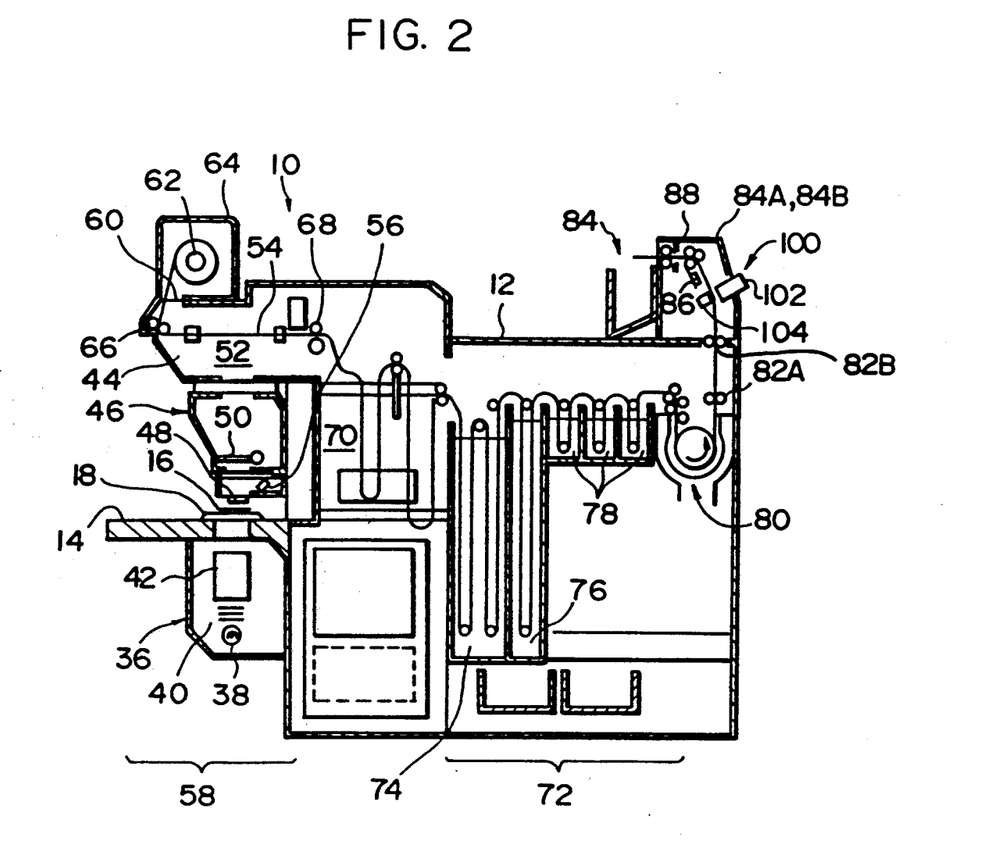
FIG. 2 is a schematic structural view illustrating inner portions of the printer processor of the present embodiment.

A printer processor 10, to which the present invention is applied, is provided with a photographic printer and a developing device, as illustrated in FIGS. 1 and 2. First, the entire structure of the printer processor 10 will be described.

A casing 12 covers the exterior of the printer processor 10.

The printer processor 10 is provided with a work table 14, which protrudes from the casing 12 toward the left in FIG. 2. A negative carrier 18, on which negative films 16 are set, is located on the upper surface of the work table 14.

As shown in FIG. 1, a negative film draw-out portion 20 is disposed at a side portion of the negative carrier 18. This negative film draw-out portion 20 draws the negative film 16 out of the main body of an unillustrated cartridge.

A light source portion 36 is disposed beneath the work table 14. The light source portion 36 is equipped with a light source 38 (see FIG. 2). Light beams irradiated from the light source 38 reach the negative film 16, which is set on the negative carrier 18, via a filter portion 40 and a diffusion tube 42. The filter portion 40 is formed of three filters C (cyan), M (magenta), and Y (yellow). Each filter can appear in front of and withdraw from the optical axis of the above-mentioned light beams.

An optical system 46 is mounted to an arm 44, which protrudes from the printer processor 10. The optical system 46 is provided with a lens 48 and a shutter 50 and is disposed at the optical axis of the above-mentioned light beams. Light beams, which are transmitted through the negative film 16, pass through the lens 48 and the shutter 50. Images of the negative film 16 are formed on photographic paper 54 set in an exposure room 52.

The optical system 46 is equipped with a density measurer 56, such as a CCD or the like, which measures the density of the negative film 16. Printing processing is possible by the light source portion 36, the optical system 46, and the exposure room 52, which together form the exposure portion 58.

An installation portion 60 is provided above the arm 44. A paper magazine 64, which winds the photographic paper 54 onto a reel 62 in the form of a roll, is installed in the installation portion 60.

Rollers 66 are disposed in a vicinity of the installation portion 60. The photographic paper 54 is sandwiched between the rollers 66 and is transported to the exposure room 52. Rollers 68 are disposed in a vicinity of the exposure room 52. In the exposure room 52, the photographic paper 54, upon which the images of the negative film 16 have been printed, is sandwiched between the rollers 68, and is transported to a reserver portion 70 which is adjacent to the exposure room 52.

The photographic paper 54, which has undergone printing processing, is stocked in the reserver portion 70. The time between printing processing in the exposure portion 58, and developing, bleaching/fixing and washing processing in a processor portion 72 is absorbed by the reserver portion 70.

The photographic paper 54, which has been discharged from the reserver portion 70, is conveyed to a color developing portion 74 of the processor portion 72 which is adjacent to the reserver portion 70. In the color developing portion 74, the photographic paper 54 is immersed in developer and undergoes developing processing. The photographic paper 54, which was subjected to developing, is transported to a bleaching-/fixing portion 76 which is adjacent to the color developing portion 74. In the bleaching/fixing portion 76, the photographic paper 54 is immersed in bleaching/fixing liquid and simultaneously undergoes bleaching and fixing processing. The photographic paper 54, which has undergone fixing processing, is transported to the rinsing portion 78 which is adjacent to the bleaching/fixing portion 76. At the rinsing portion 78, the photographic paper 54 is immersed in rinse water and undergoes washing processing.

The photographic paper 54, which has undergone washing processing, is conveyed to the drying portion 80 which is adjacent to the rinsing portion 78. In the drying portion 80, the photographic paper 54 is wound about a roller, exposed to hot air, and dried.

The photographic paper 54 is sandwiched between a pair of rollers 82A, and is discharged from the drying portion 80 at a constant speed after undergoing drying processing. A pair of rollers 82B is disposed above the rollers 82A. The rollers 82B rotate continuously in accordance with the processing of a cutter portion 84, which is disposed downstream from the drying portion 80. The cutter portion 84 includes a cut mark sensor 86, which detects cut marks applied to the photographic paper 54, and a cutter 88, which cuts the photographic paper 54. The cutter portion 84 cuts the photographic paper 54 into image frames, which are discharged out of the casing 12 of the printer processor 10.

As illustrated in FIG. 2, a print measuring portion 100, which is the color balance measuring device of the present invention, is provided in the cutter portion 84 of the printer processor 10 structured as described above.

Figure 3:
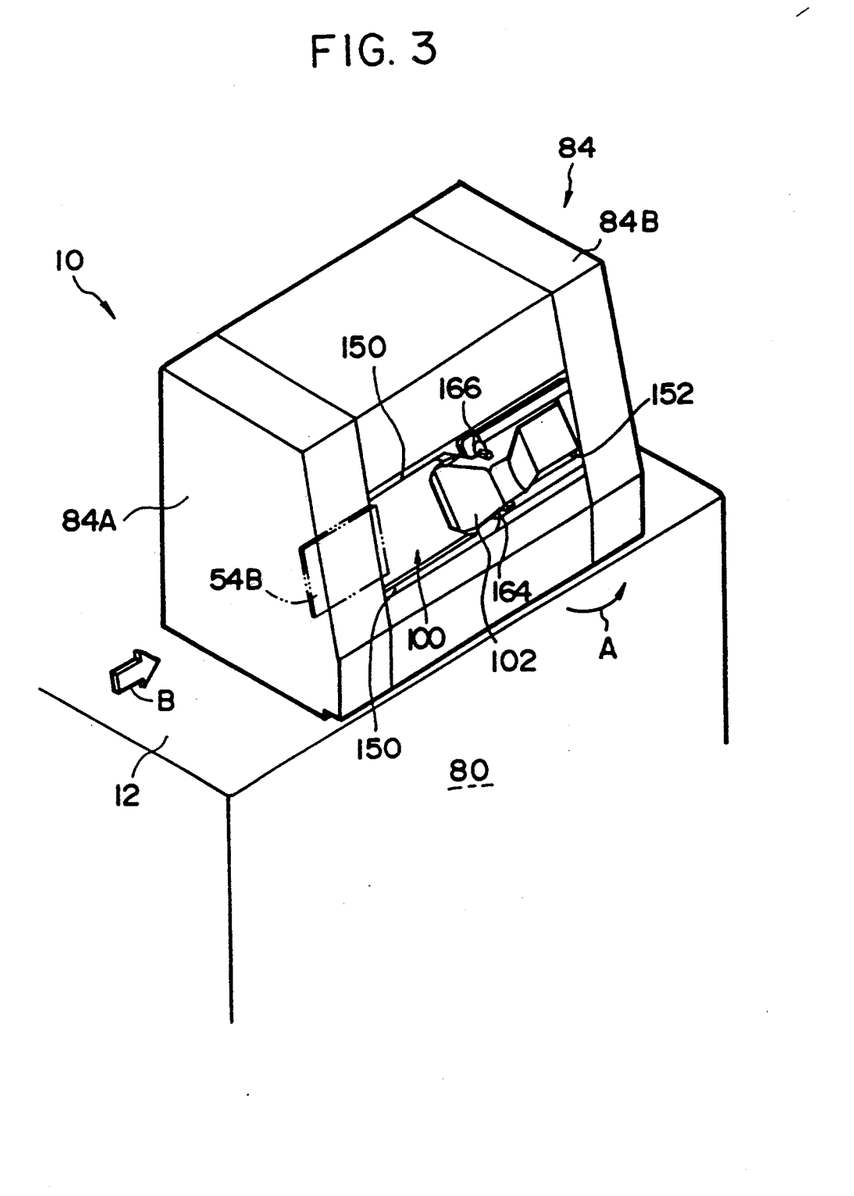
FIG. 3 is a perspective view of principle portions of a print measuring portion of the present embodiment, as seen from a direction different from that in FIG. 1.

As shown in FIGS. 2 and 3, the print measuring portion 100 is provided between side plate 84A and side plate 84B of the cutter portion 84, along the transport path of the photographic paper 54, and upstream from the cut mark sensor 86 (at the drying portion 80 side, as shown in FIG. 2). In the print measuring portion 100, a density measuring head 102 and a print pushing portion 104 are disposed with the transport path located therebetween.

Figure 6:
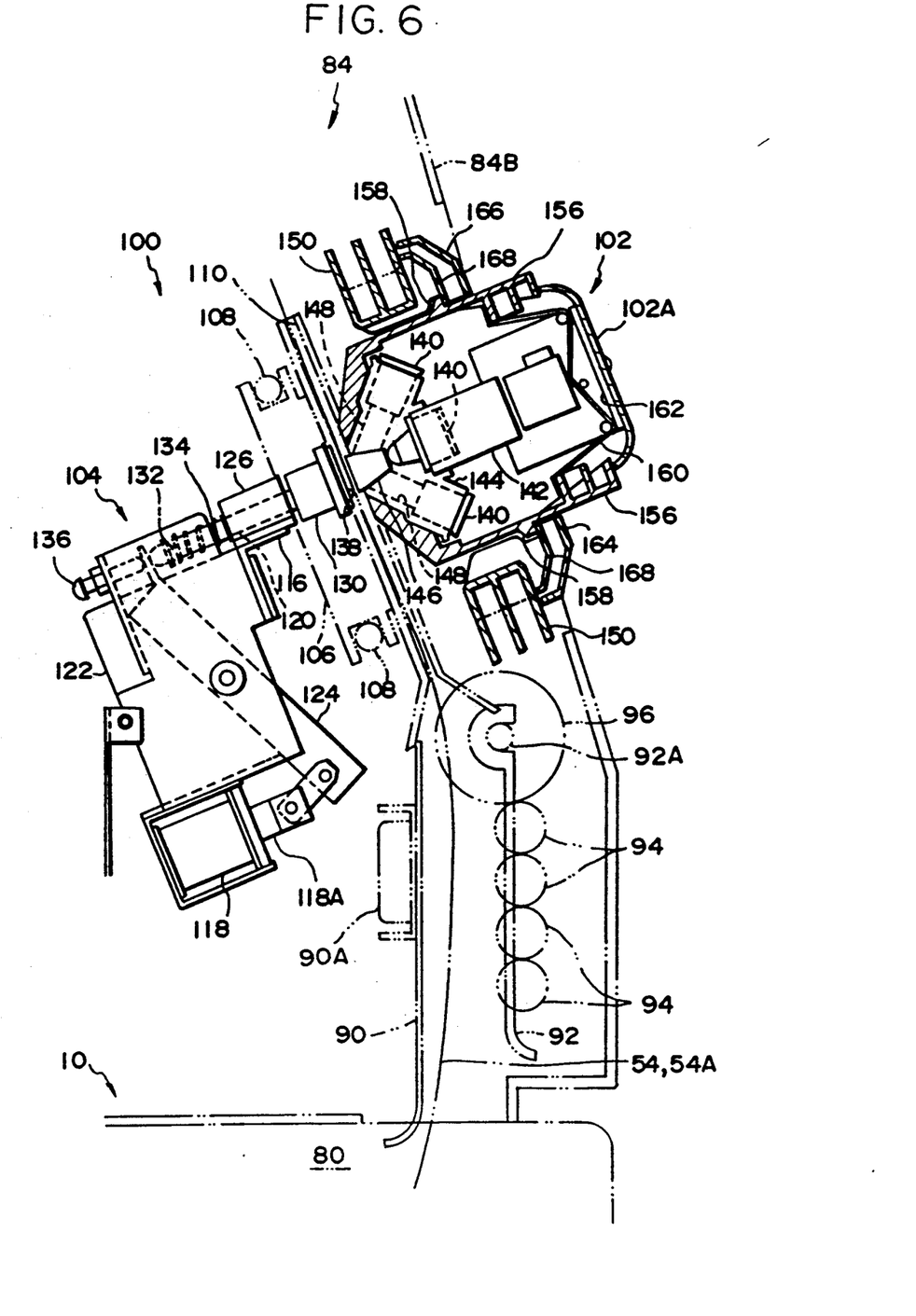
FIG. 6 is a cross-sectional view of principle portions taken along line 6—6 of FIG. 4.

As shown in FIG. 6, the photographic paper 54, which has undergone drying processing in the drying portion 80, is guided by a guide 90, which is mounted via a bracket 90A, and by small diameter rollers 94, which are axially supported by a bracket 92, and by a guide roller 96. The photographic paper 54 is guided to paper guides 106 provided in the print measuring portion 100. The bracket 90A is mounted to a bracket 114, which will be described later. The bracket 92 is axially supported by the bracket 114 via a shaft 92A. (Both of the preceding two constructions are omitted from the drawings).

Figure 4:
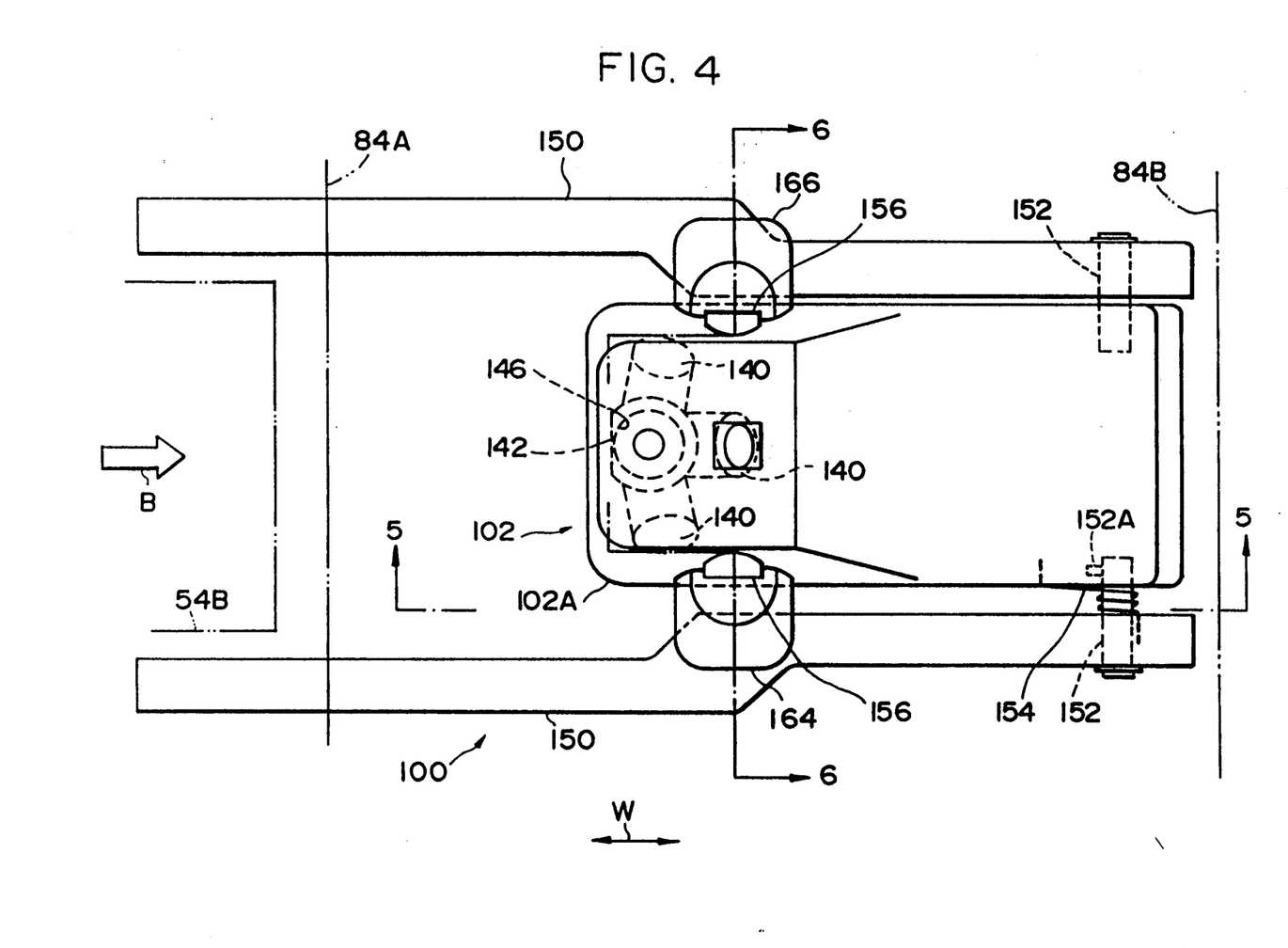
FIG. 4 is a plan view of principle portions of the print measuring portion as seen from the exterior of the printer processor of the present embodiment.
Figure 5:
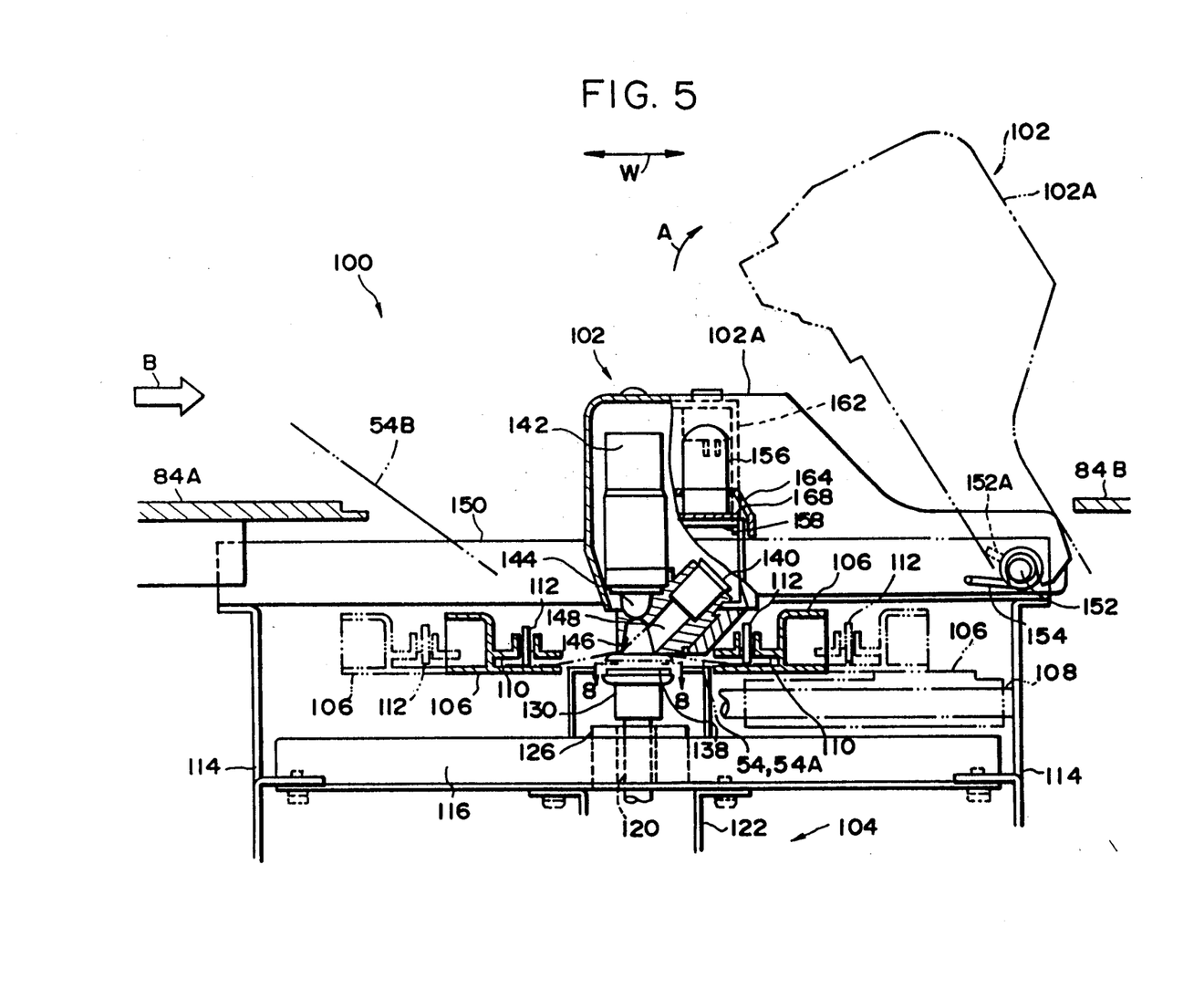
FIG. 5 is a cross-sectional view of principle portions taken along line 5—5 of FIG. 4.

As shown in FIGS. 5 and 6, the paper guides 106 are provided as a pair, one at either end portion in the transverse direction of the photographic paper 54 which is conveyed. The paper guides 106 are disposed along the transverse direction of the photographic paper 54 (in the direction of arrow W in FIGS. 4 and 5). The paper guides 106 are supported so as to be movable in directions of approaching and moving away from each other along a pair of guide shafts 108, which are suspended between the brackets 114 (see FIG. 5). The gap between grooves 110 of the pair of paper guides 106 can be adjusted in accordance with the width of the photographic paper. Incidentally, FIG. 5 is a cross-sectional view of the print measuring portion 100 as seen from the downstream side of the transport path of the photographic paper. The two-dot chain line paper guides 106 represent the paper guides 106 in a state in which they have moved away from each other along the guide shafts 108.

The grooves 110 are provided in the paper guides 106 such that end portions of the photographic paper 54 in the transverse direction can be inserted into the grooves 110. Further, at each of the paper guides 106, a roller 112, of which a part of the outer periphery thereof protrudes into the groove 110, is axially supported. The axes of the rollers 112 are in the transverse direction of the photographic paper 54. The rollers 112 push on the end portions in the transverse direction of the photographic paper 54, which is transported along the grooves 110, and move the photographic paper 54.

As shown in FIG. 5, in vicinities of the paper guides 106, the pair of brackets 114 are fixed at respective vicinities of the side plates 84A, 84B of the cutter portion 84. A bracket 116 is suspended between the pair of brackets 114.

The print pushing portion 104 is provided on the bracket 116, as shown in FIG. 6. The print pushing portion 104 includes a pusher member 130 and a solenoid 118, which forms the driving means.

A solenoid bracket 122 is mounted to the bracket 116. The solenoid 118 and a pushing shaft 120 are mounted to the solenoid bracket 122. One end of the solenoid bracket 122 is connected to a drive shaft 118A of the solenoid 118. At the other end of the solenoid bracket 122, an intermediate portion of a link 124, which abuts an end portion of the pushing shaft 120, is axially supported. Further, an intermediate portion of the pushing shaft 120 is supported by a bearing 126 which is provided on the bracket 116. The pusher member 130 is connected to the other end of the pushing shaft 120.

At a vicinity of the end portion of the pushing shaft 120 on the link 124 side, a coil stopper 132 is fixed so as to protrude in the radial direction of the pushing shaft 120. A compression coil spring 134 is provided between the coil stopper 132 and the bearing 126. The pushing shaft 120 is thereby urged in the direction opposite of the transport path of the photographic paper 54.

Figure 8:
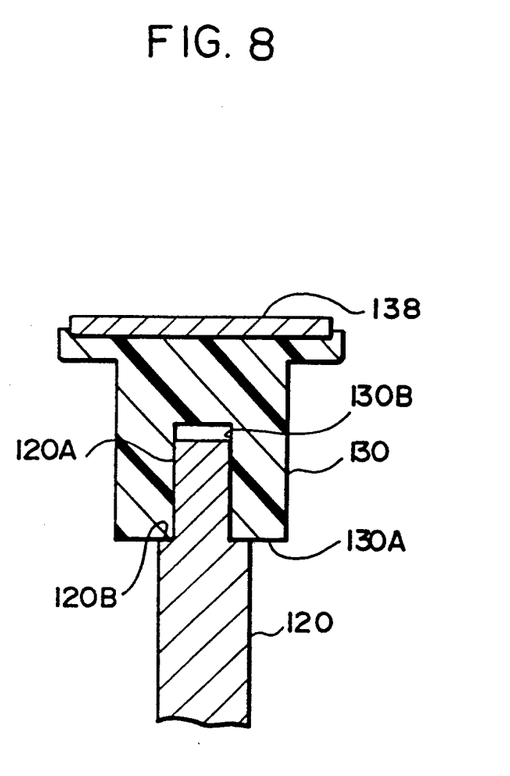
FIG. 8 is a cross-sectional view of principle portions taken along line 8—8 of FIG. 5 and illustrating the presser member of the present embodiment.

As shown in FIG. 8, the pusher member 130 is formed as a small diameter cylindrical member and a large diameter cylindrical member joined together, and is integrally made of rubber. An insertion hole 130B is formed in a bottom portion 130A, on the pushing shaft 120 side, of the pusher member 130. A reduced diameter portion 120A is formed coaxially at the end, on the pusher member 130 side, of the pushing shaft 120. A step portion 120B is formed between the pushing shaft 120 and the reduced diameter portion 120A.

The reduced diameter portion 120A of the pushing shaft 120 is forced into the insertion hole 130B of the presser member 130. The bottom portion 130A of the presser member 130 and the step portion 120B of the pressing shaft 120 contact. The pressing shaft 120 and the presser member 130 are thereby connected to each other so as to be separable.

As shown in FIG. 6, in the print pushing portion 104, the drive shaft 118A is accommodated within the solenoid 118 by the driving of the solenoid 118. Accordingly, the pushing shaft 120 is pushed via the link 124 against the urging force of the compression coil spring 134, and moves in the direction of the transport path of the photographic paper 54. Accordingly, the presser member 130, which is connected to the end of the pushing shaft 120, is thrust into the transport path of the photographic paper 54.

Further, when the solenoid 118 is off, the pushing shaft 120 is urged by the compression coil spring 134. The presser member 130 thereby moves to a position withdrawn from the transport path of the photographic paper 54. In this case, the drive shaft 118A of the solenoid 118 is drawn out from the interior of the solenoid 118 via the line 124.

A screw 136 is screwed into the bracket 122, and abuts a side of the link 124 opposite the pushing shaft 120 side of the link 124. This screw 136 controls the position at which the pusher member 130 withdraws from the transport path of the photographic paper 54, and prevents the pushing shaft 120 from being separated from the solenoid bracket 122.

As shown in FIGS. 5, 6, and 8, a white reference plate 138 is fixed at the side of the presser member 130 opposite the pushing shaft 120. Vitreous enamel may be used to bake finish the surface of the white reference plate 138 which faces the transport path of the photographic paper 54 a white color.

As shown in FIGS. 5 and 6, the density measuring head 102 is provided opposing the print pushing portion 104 on the opposite side of the transport path of the photographic paper 54. A surface, which is provided on the density measuring head 102 side of the photographic paper 54, is an emulsion surface upon which images recorded on the negative film 16 are exposed in the exposure section 58.

Inside the density measuring head 102, a light source 142 and three density sensors 140 are integrally supported by a bracket 144. The density measuring head 102 can measure the amounts of light of red, blue, and green by the respective density sensor 140.

Figure 7:
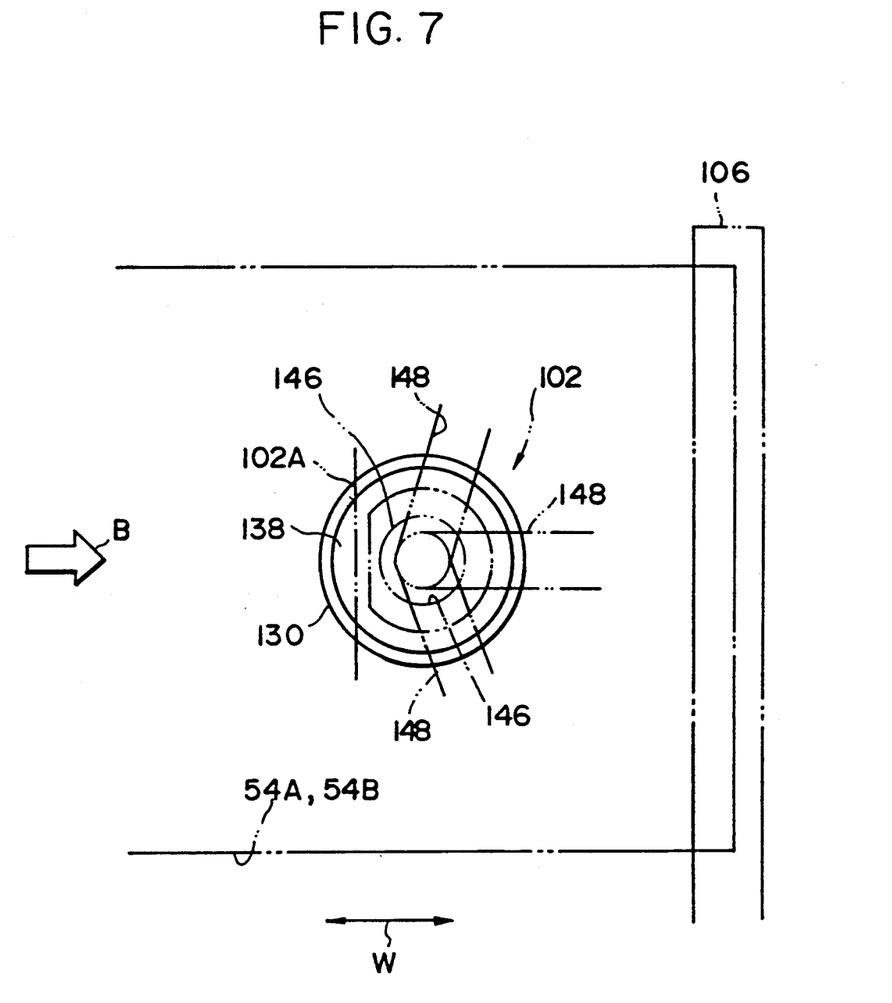
FIG. 7 is a schematic plan view illustrating a positional relationship between a presser member and a photometric hole of the present embodiment.

As shown in FIG. 7, a photometric hole 146, which is connected to the light source 142, is formed at a position at which the density measuring head 102 opposes the white reference plate 138. In FIG. 7, the planar arrangement of the position at which the white reference plate 138 and the photometric hole 146 abut each other is illustrated.

As shown in FIGS. 5 and 6, the three density sensors 140 are connected to the photometric hole 146 by light paths 148 formed in the bracket 144. By closing the opening of the photometric hole 146, the light paths 148 and the photometric hole 146 are covered, and outside light cannot enter therein. Normally, the edges of the opening of the photometric hole 146 are spaced away from the photographic paper 54 guided by the paper guides 106 so that the edges of the opening do not contact the photographic paper 54.

The white reference plate 138, which protrudes out into the transport path of the photographic paper 54, contacts a vicinity of the photometric hole 146 and is fit thereat by the operation of the print pressing portion 104. Further, when the photographic paper 54, which is guided along the pair of paper guides 106, is disposed in the vicinity of the photometric hole 146, the white reference plate 136 pushes the photographic paper 54 toward the photometric hole 146 and fits the photographic paper 54 by the operation of the print pressing portion 104.

The density measuring head 102 is axially supported by a pair of supporting brackets 150 which span between the pair of brackets 114 which support the print pressing portion 104. The density measuring head 102 is axially supported at the supporting bracket 150 by shafts 152, which are fixed at a casing 102A of the density measuring head 102 at end portions, on the side plate 84B side, of the supporting brackets 150. The density measuring head 102 is pivotable in the direction of arrow A in FIG. 5. Moreover, a torsion coil spring 154 is disposed on the outer periphery of one of the shafts 152. Ends of the torsion coil spring 154 engage with the density measuring head 102 and the supporting bracket 150 respectively. The density measuring head 102 is urged by the tension coil spring 154 around the shaft 152 in the direction of arrow A in FIG. 5, i.e., in the direction of moving away from the transport path of the photographic paper 54.

As shown in FIGS. 3 and 4, the space between the pair of supporting brackets 150 is wide on the side towards the side plate 84A and forms an opening portion. Accordingly, the transport path of the photographic paper 54 in the vicinity of the presser member 130 can be viewed from the side plate 84A side. A reference print 54B, to be described later, can be inserted into the paper guide 106 which opposes the density measuring head 102.

As shown in FIG. 6, end portions, in the transport path side, of the side surfaces of the density measuring head 102 (the surfaces at the upstream and downstream sides of the transport path, as shown in FIG. 6) are swinging portions 156, which are formed integrally with the casing 102A. These swinging portions 156 deform elastically with end portions, which are formed integrally with the casing 102A, as the centers of deformation. The end portions on the opposite sides can swing so as to come out of and enter into the casing 102A.

A protrusion 158, which protrudes outwardly away from the casing 102A, is formed on each of the swinging portions 156. The swinging portions 156 engage with a flat spring 160 inside the casing 102A. The flat spring 160 is supported by a bracket 162 mounted to the casing 102A. The swinging portions 156 are urged by the flat spring 160 in directions of protruding from the casing 102A. The swinging portions 156 can swing against the urging force of the flat spring 160 in directions of being accommodated in the casing 102A.

It is not necessary that the swinging portions 156 be formed integrally with the casing 102A; it suffices that the swinging portions 156 are axially supported at the casing 102A so as to be able to swing. Further, it is possible for the swinging portions 156 to be urged in directions of protruding from the casing 102A by a compression coil spring or the like.

As shown in FIGS. 4 through 6, at the positions of supporting brackets 150 where the density measuring head 102 is opposed to the swinging portions 156, stoppers 168, which engage with the protrusions 158 of the swinging portions 156, are provided.

The density measuring head 102 is rotated in the direction opposite that of arrow A (shown in FIG. 5) against the urging force of the torsion coil spring 154. The density measuring head 102 is prevented, by the engagement of the protrusions 158 of the swinging portions 156 with the respective stoppers 168, from rotating in the direction of arrow A due to the urging force of the torsion coil spring 154. Accordingly, the density measuring head 102 is in a state of engagement with the supporting brackets 150. The photometric hole 146 of the density measuring head 102 opposes the white reference plate 138 of the print pushing portion 104. Moreover, the swinging portions 156 are pushed against the urging force of the flat spring 160 in directions of being accommodated within the casing 102A. The engagement of the protrusions 158 with the stoppers 168 is thereby released. The density measuring head 102 rotates in the direction of arrow A by the urging force of the torsion coil spring 154.

Shading portions 164, 166, which cover the stoppers 168 when the protrusions 158 are engaged with the stoppers 168, are provided at the swinging portions 156. As shown in FIG. 5, a stopper 152A is provided between the density measuring head 102 and the shaft 152. The density measuring head 102, which is rotated by being urged by the torsion coil spring 154, moves away from the transport path of the photographic paper 54 and is stopped and supported by the stopper 152A in a vicinity of the side plate 84B.

Adjustment of color balance by the printer processor 10 is effected as follows. An unillustrated bull's eye negative, upon which a monochrome circular color image is recorded, is exposed, and a bull's eye print 54A is produced. Using the above-mentioned bull's eye negative, a reference print 54B is printed in advance at the appropriate conditions (appropriate color balance and amount of exposure), and is set aside. The bull's eye print 54A is compared with the reference print 54B and color correction is effected. The measured value of the bull's eye print 54A and the measured value of the reference print 54B are compared in an unillustrated comparing/calculating portion. Using this compared information as a standard, color correction of each color is effected when the photographic paper 54 is printed. In color correction, when the photographic paper 54 is exposed, the amount of exposure (exposure time) for each of the C, M, and Y filters is regulated.

Further, the print measuring section 100, which measures the bull's eye print 54A and the reference print 54B, is disposed such that image portions are disposed above the pusher member 130, as shown in FIG. 7.

Operation of the present embodiment will be described hereinafter.

First, the order of exposure by the printer processor 10 and the order of processing of the photographic paper 54 will be described.

When processing begins, the light source 38 is lit, and the negative carrier 18 is driven to position the negative film 16. Next, the LATD (large area transmittance density) of the negative film 16 is measured by the density measurer 56, and the amount of exposure (exposure time) is calculated. In this case, the amount of correction of exposure during simultaneous printing is read based on the film identification number. This amount is collated, and optimal print conditions are obtained.

Next, the photographic paper 54 is transported to the exposure room 52 and positioned. The shutter 50 is opened. Accordingly, light beams irradiated from the light source 38 are transmitted through the filter portion 40 and the negative film 16, and reach the exposure room 52. The printing of the images of the negative film 16 onto the photographic paper 54, which is positioned in the exposure room 52, begins. Each of the C, M, and Y filters, which are positioned on the optical axis of the above-mentioned light beams, is moved in accordance with the exposure conditions. After the predetermined exposure time has elapsed, the shutter 50 is closed. Printing processing of one of the image frames of the negative film 16 is completed in this way. By repeating these processes, the portions of the photographic paper 54 which have undergone printing processing are successively transported to the reserver portion 70.

The photographic paper 54, which has been transported to the reserver portion 70, is transported to the color developing portion 74. There, the photographic paper 54 is immersed in developing liquid, and developing processing is effected. The photographic paper 54, which has undergone developing processing, is transported to the bleaching/fixing portion 76 and undergoes fixing processing. The photographic paper 54, for which fixing processing has been effected, is conveyed to the rinsing portion 78 where it undergoes washing processing. The photographic paper 54, which has undergone washing processing, is transported to the drying portion 80 where drying processing is effected.

The photographic paper 54, which has undergone drying processing, is transported to the cutter portion 84. There, the photographic paper 54 is cut into image frames by the cut mark sensor 86 and the cutter 88. Thereafter, the photographic paper 54, which has been cut into image frames, is discharged out of the casing 12. Because the density measuring head 102 and the pusher member 130 of the print measuring portion 100 are separated from the transport path of the photographic paper 54, neither the density measuring head 102 nor the pusher member 130 contact the photographic paper 54 which is being conveyed.

Next, color balance measuring of the print measuring portion 100 of the printer processor 10 will be described.

First, calibration of the print measuring section 100, before color balance adjustment is carried out, is effected as the light source 142 of the density measuring head 102 is lit and the light source 142 is held stable.

The white reference plate 138 is fit to a vicinity of the photometric hole 146 of the bracket 144 of the density measuring head 102 by the operation of the print pushing portion 104. At this time, the pusher member 130 pushes the density measuring head 102 substantially in the urging direction of the tension coil spring 154. Therefore, the density measuring head 102 is reliably fixed by the engagement of the protrusions 158 and the stoppers 168. Further, because the pusher member 130 is made of rubber, the density measuring head 102 is not pushed by a force greater than that which is necessary. When the white reference plate 138 is pushed and inclined evenly with respect to the photometric hole 146 of the density measuring head 102, the pusher member 130 is elastically deformed by the pushing force of the pushing shaft 120. The white reference plate 138 thereby evenly contacts the density measuring head 102.

Light irradiated from the light source 142 reflects off of the white reference plate 138 and reaches the density sensors 140 via the light paths 148. The amounts of light of blue, green, and red are measured by the three respective density sensors 140.

When white is at the white reference plate 138, the amounts of light of blue, green, and red are equally reflected. Accordingly, relative correction is effected such that the sensitivities of the three density sensors 140 are equal.

In color balance adjustment of the printer processor 10, with the light source 142 of the print measuring section 100 stable, the reference print 54B is inserted from the outside of the cutter portion 84 at the side plate 84A side as shown in FIG. 5 (the reference print 54B is inserted in the direction of large arrow B shown in FIGS. 5 and 7). In this case, as shown in FIGS. 3 and 5, the swinging portions 156 of the density measuring head 102 are pushed into the casing 102A. The engagement of the protrusions 158 and the stoppers 168 is canceled, and the density measuring head 102 rotates in the direction of arrow A. Accordingly, the white reference plate 138 and vicinities of the paper guides 106 are opened.

An end of the reference print 54B is inserted from the direction of large arrow B in FIGS. 4 and 5 into the groove 110 of the paper guide 106 on the side plate 84B side. The image portion of the reference print 54B is disposed on the white reference plate 138 (the state illustrated in FIG. 7). In this way, the image portion of the reference print 54B is positioned so as to oppose the photometric hole 146 of the density measuring head 102. Thereafter, the density measuring head 102 is rotated in the direction of the white reference plate 138 (in the opposite direction of the direction shown by arrow A in FIGS. 3 and 5) against the urging force of the torsion coil spring 154. The protrusions 158 of the density measuring head 102 engage with the stoppers 168, which are provided respectively on the pair of supporting brackets 150. Even in the position in which the density measuring head 102 is engaged by the shading portions 164, 166, the reference print 54B can be inserted, from the opening portion between the density measuring head 102 and the side plate 84A, while being viewed.

In this way, the photometric hole 146 of the density measuring head 102 is opposed to the image portion of the reference print 54B.

Thereafter, the print pushing member 104 is operated, and the pusher member 130 is protruded. The reference print 54B is thereby fit against the density measuring head 102.

In this state, at the density measuring head 102, the amounts of light of each of blue, green, and red light, which are reflected off of the reference print 54B, are measured.

In addition, the image of the bull's eye negative is exposed on the photographic paper 54. Developing and drying processes are effected, and the bull's eye print 54A is produced. The bull's eye print 54A is transported from the drying portion 80 and conveyed to the paper guides 106 of the print measuring portion 100. Thereafter, the transport of the bull's eye print 54A is stopped with the image portion of the bull's eye print 54A positioned so as to oppose the photometric hole 146 of the density measuring head 102.

At this position, by the operation of the print pushing portion 104, the pusher member 130 fits the bull's eye print 54A to the density measuring head 102. Appropriate density measurement is possible in this state.

The amounts of light of blue, green and red of the bull's eye print 54A, which are measured by the density sensors 140, are compared with those of the reference print 54B, which are also measured by the density sensors 140, by the unillustrated comparing/calculating portion. Adjustment of the amount of exposure (exposure time) of each of the C, M, and Y filters, when exposure is effected in the exposure portion 58 of the printer processor 10, may be effected according to the information of the comparing/calculating portion.

In the print measuring portion 100 of the printer processor 10, the density measuring head 102 and the pusher member 130 are usually separated from the transport path of the photographic paper 54. Accordingly, during normal use of the printer processor 10, vicinities of the print measuring portion 100 do not contact the photographic paper 54, which is being conveyed, nor do they damage the surface of the photographic paper 54.

Moreover, because the white reference plate 138 is provided at the pusher member 130, calibration can be effected by easily fitting the white reference plate 138 to the density measuring head 102 by the pusher member 130.

The white reference plate 138 can be easily changed as the pusher member 130 is removable from the pushing shaft 120.

In order to measure color balance, the reference print 54B can be positioned with respect to the density measuring head 102 by the vicinity of the pusher member 130 being opened by the rotation of the density measuring head 102. Because the reference print 54B is fitted to the density head 102 by the pusher member 130, density measurement of the reference print 54B becomes easy.

It suffices if the bull's eye print 54A, which has undergone developing and drying processing, is transported to the position at which the bull's eye print 54A opposes the density measuring head 102, and is stopped thereat.

In this way, in the printer processor 10 of the present embodiment, even if the print measuring portion 100, which measures color balance, is located along the transport path of the photographic paper 54, the surface of the photographic paper 54, which is being transported, is not damaged. Further, color balance measurement is facilitated.

In the present embodiment, the print pushing portion 104 is operated, and the pusher member 130 is fitted to the density measuring head 102. However, the pusher member 130 may be fitted by moving the density measuring head 102 and not the pusher member 130.

Further, the present embodiment was explained by applying the print measuring portion 100 to the printer processor 10 which prints images, which are recorded on the negative film 16, onto the photographic paper 54. However, the present embodiment can be applied to a printing apparatus, in which images recorded on a positive film are printed onto photographic paper, or the like. The present embodiment can also be applied to a color balance measuring device of a printing apparatus which prints color images which have been exposed by color filters.

What is claimed is:

1. A color balance measuring device for regulating color balance in a photographic printer in which color images recorded on a film are printed onto photographic paper to obtain photographic prints, comprising:

a density measuring portion which irradiates light of a light source toward said photographic prints, and measures per color the amount of reflected light;

a pusher member able to move in directions of approaching and moving away from said density measuring portion;

a white reference plate provided on a density measuring portion side of said pusher member; and moving means for moving at least one of said pusher member and said density measuring portion in directions in which said pusher member and said density measuring portion approach and move away from each other, and for pushing at least one of said pusher member and said density measuring portion toward another via said white reference plate.

2. A color balance measuring device according to claim 1, wherein said white reference plate is fitted to said density measuring portion when at least one of said pusher member and said density measuring portion is pushed toward the other.

3. A color balance measuring device according to claim 1, wherein said moving means includes urging means for moving said pusher member and said density measuring portion away from each other.

4. A color balance measuring device according to claim 1, wherein said moving means moves said pusher member such that said pusher member and said density measuring portion move away from each other.

5. A color balance measuring device according to claim 1, wherein said pusher member is an elastic body.

6. A color balance measuring device according to claim 4, wherein said pusher member is connected to said moving means so as to be removable from said moving means.

7. A color balance measuring device for regulating color balance in a photographic printer in which color images recorded on a film are printed onto photographic paper to obtain photographic prints, comprising:

a density measuring portion which is disposed at a predetermined distance with respect to surfaces of said photographic prints which are transported along a transport path, irradiates light from a light source towards said transport path, and measures per color the amount of reflected light;

a pusher member which is provided opposing said density measuring portion such that said transport path is located between said pusher member and said density measuring portion, said pusher member being movable in directions of approaching and moving away from said density measuring portion;

a white reference plate provided on a transport path side of said pusher member; and moving means for moving at least one of said pusher member and said density measuring portion in directions in which said pusher member and said density measuring portion approach and move away from each other, and for pushing one of said pusher member and said density measuring portion toward another via said white reference plate.

8. A color balance measuring device according to claim 7, wherein said pusher member is provided at a side opposing said density measuring portion such that when said pusher member and said density portion are moved away from each other, said white reference plate is maintained at a predetermined distance with respect to surfaces of said photographic prints which are transported along said transport path.

9. A color balance measuring device according to claim 7, wherein said white reference plate is fitted to said density measuring portion when one of said pusher member and said density measuring portion is pushed toward the other.

10. A color balance measuring device according to claim 7, wherein said moving means includes urging means for moving said pusher member and said density measuring portion away from each other.

11. A color balance measuring device according to claim 7, wherein said moving means moves said pusher member such that said pusher member and said density measuring portion move away from each other.

12. A color balance measuring device according to claim 11, wherein said pusher member approaches said density measuring portion, crosses said transport path, and is pushed by said density measuring portion.

13. A color balance measuring device according to claim 7, wherein said pusher member is an elastic body.

14. A color balance measuring device according to claim 11, wherein said pusher member is connected to said moving means so as to be removable from said moving means.

15. A color balance measuring device according to claim 7, further comprising:

guide means provided on both sides in a transverse direction of said transport path of said photographic prints, such that said photographic prints are transported with end portions in a transverse direction of said photographic prints inserted in said guide means.

16. A color balance measuring device according to claim 7, further comprising:

an opening portion formed adjacent to said density measuring portion at one side end in a transverse direction of said transport path, and communicating with said transport path which is opposed to said density portion.

17. A color balance measuring device according to claim 7, further comprising:

a supporting axis about which said density measuring portion is rotatable between a state in which said density measuring portion approaches said transport path of said photographic prints and a state in which said density measuring portion moves away from said transport path of said photographic prints;

urging means for urging said density measuring portion around said supporting axis in a direction of moving away from said transport path; and maintaining means for maintaining said density measuring portion near said transport path against an urging force of said urging means.

18. A pushing device used in a color balance measuring device for regulating color balance in a photographic printer in which color images recorded on a film are printed onto photographic paper to obtain photographic prints, said pushing device pushing said photographic prints toward a density measuring portion of the color balance measuring device, said pushing device comprising:

a base portion used for pushing; and a white reference plate provided at a pushing direction side of said base portion.

* * * * *